United States Patent [19]
Hilburn

[11] 3,786,303
[45] Jan. 15, 1974

[54] CATHODE RAY TUBE DUAL MODE HORIZONTAL DEFLECTION CONTROL AMPLIFIER

[75] Inventor: Hugh C. Hilburn, Phoenix, Ariz.

[73] Assignee: Sperry Rand Corporation, Great Neck, N.Y.

[22] Filed: Apr. 12, 1971

[21] Appl. No.: 132,950

[52] U.S. Cl. .......... 315/27 TD
[51] Int. Cl. .......... H01j 29/70
[58] Field of Search .......... 315/27 TD, 27 R, 315/28, 29

[56] References Cited

UNITED STATES PATENTS 3,602,768 8/1971 Williams .......... 315/27 TD

OTHER PUBLICATIONS

"Electronic Devices and Circuits," Millman & Halkias, p. 359, 1967.

*Primary Examiner*—Carl D. Quarforth
*Assistant Examiner*—J. M. Potenza
*Attorney*—S. C. Yeaton

[57] ABSTRACT

A dual mode cathode ray tube horizontal deflection amplifier normally operable in a linear mode for horizontal forward scanning and/or symbol writing during the vertical re-trace period and controllably switchable to a non-linear resonant flyback mode for horizontal re-trace. The amplifier comprises a differential input stage cascaded with a push-pull output stage which couples to both the horizontal defection coil of the cathode ray tube and a parallel connected capacitor, forming a resonant circuit. The differential input stage compares the input deflection signal with a feedback signal proportional to the beam deflection to assure linear control. Switch-over to the resonant flyback mode is accomplished by actuating the push-pull stage so as to present a high impedance to the resonant circuit whereupon a half-cycle of oscillation commences to produce the horizontal retrace.

7 Claims, 6 Drawing Figures

INVENTOR
HUGH C. HILBURN
BY
H.P. Terry
ATTORNEY

INVENTOR
HUGH C. HILBURN
BY
H P Terry
ATTORNEY

CATHODE RAY TUBE DUAL MODE HORIZONTAL DEFLECTION CONTROL AMPLIFIER

BACKGROUND OF THE INVENTION

1. Field of the Invention

The present invention relates to cathode ray tube (CRT) electronic beam deflection control apparatus and more particularly to the driver circuits associated therewith.

2. Description of the Prior Art

In the present state of the CRT display art, a capability for superpositioning symbols or other data on the conventional television raster scan presentation is required for many applications. As explained in U.S. Pat. No. 3,499,979, issued Mar. 10, 1970, to Fiorletta et al. and assigned to the assignee of the instant application, such capability is inexpensively and reliably attained by means of a multiplexing technique wherein the symbol data is written on the CRT screen during the vertical retrace period of the raster scan. Inasmuch as the vertical raster scan rate is comparatively slow, a linear deflection amplifier is suitable for vertical deflection control. In the case of the horizontal deflection, on the other hand, the raster scanning rate is substantially faster and as a consequence is typically performed with a non-linear resonant flyback circuit. Symbol generation, however, requires linear operation in both the horizontal and vertical channels. This could be achieved by operating both channels continuously in a linear mode, but is considered undesirable in the case of the horizontal channel because the high scanning rates preclude linear operation without an intolerable increase in power consumption. This problem is overcome in accordance with the teaching of the above-mentioned patent by utilizing a dual mode amplifier in the horizontal channel. The dual mode amplifier is selectively controlled to operate in a linear mode for symbol writing purposes during the vertical retrace and, if desired, can also be operated in the linear mode for horizontal forward scanning. The horizontal retrace, however, is always accomplished with the dual mode amplifier operating in a non-linear resonant flyback mode.

The present invention is directed to an improved dual mode amplifier incorporating less components and fewer switching inputs for selecting the desired operating condition while providing the same operational options, that is, linear operation during the vertical retrace and/or the horizontal forward scan and non-linear resonant flyback operation for horizontal retrace.

SUMMARY OF THE INVENTION

A preferred dual mode horizontal deflection amplifier constructed according to the principles of the present invention includes a differential input stage for subtractively combining the multiplexed horizontal input signal, that is, symbol stroke or television raster scan, with a feedback signal representative of the current flowing through the CRT deflection coil, thereby providing matched highly linear horizontal scanning and symbol stroking. A push-pull stage cascaded with the differential input stage has its output coupled to the deflection coil which in turn is connected to a current sampling resistor for providing the feedback signal and to a capacitor to form the resonant circuit utilized during flyback operation. The push-pull stage operates in a conventional manner, one section being conductive for one polarity of the input signal and the other section being conductive for the opposite polarity of the input signal. The section which responds to a positive polarity input is coupled to the deflection coil through an appropriately poled diode which functions to conduct the input signal to the deflection coil and subsequently during non-operation of that section to preclude the flyback signal from being conducted thereto during the resonant retrace. The other section of the push-pull stage, which responds to a negative polarity input, has a switching circuit coupled into it for selectively driving certain transistor components thereof to a non-conducting state. Under this condition, the resonant circuit comprising the capacitor and deflection coil is connected essentially to an open circuit provided by the high inverse impedance of the diode coupled to one section of the push-pull stage and the non-conducting transistors of the other section whereupon a half cycle resonant discharge occurs causing the CRT beam to retrace in readiness for the next horizontal scan line. As long as the switch controlled section of the push-pull stage is not driven to a non-conducting state, however, the dual mode amplifier continues to function in the linear mode which is used for either symbol writing or horizontal forward scanning. Other features and advantages of the invention will become apparent from the following detailed description.

Figure 1:
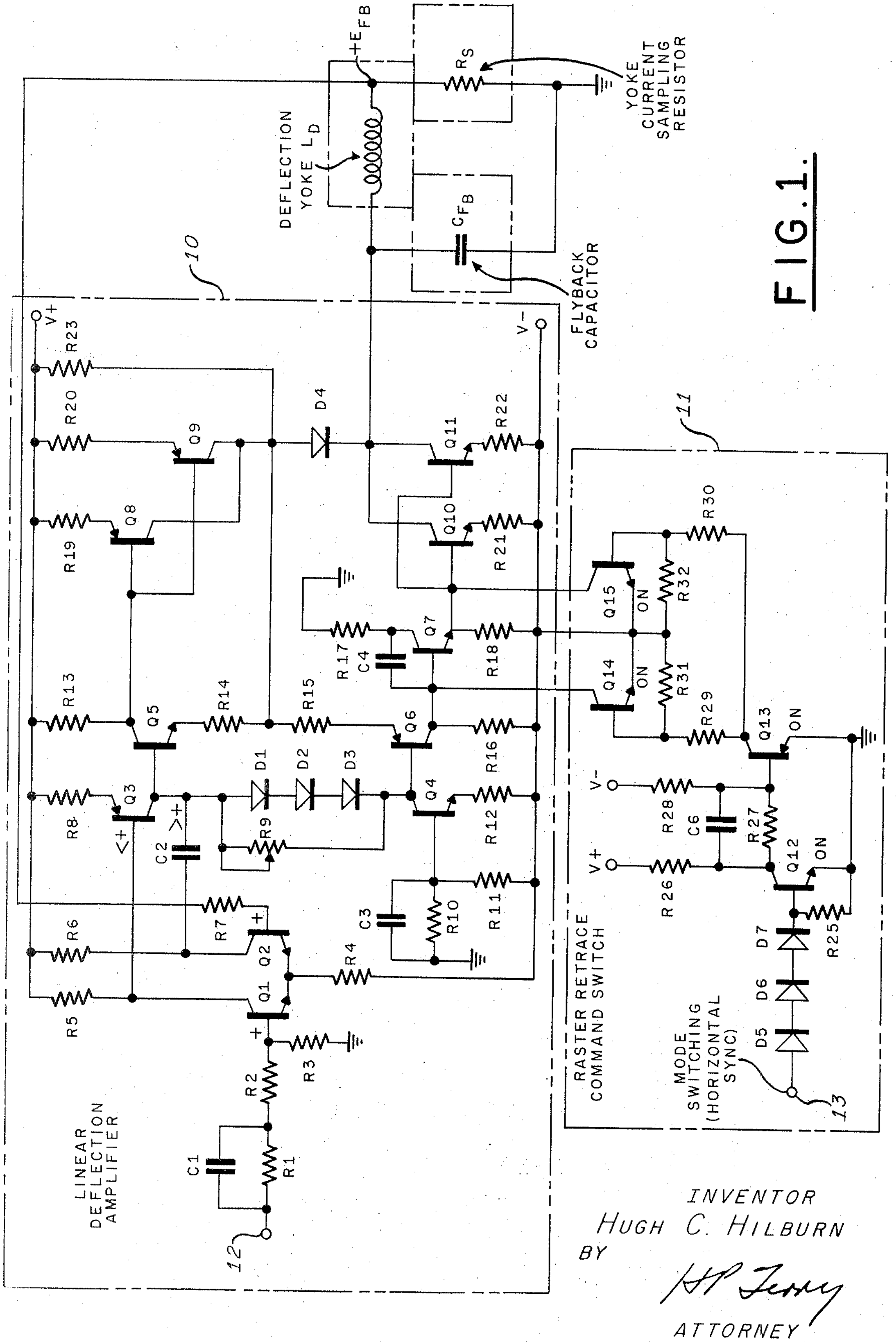
FIG. 1 is a schematic diagram of a circuit embodying the principles of the invention.

FIGS. *2a* to *2e* are illustrations of waveforms indicating the relationship of various signals occurring in the operation of the circuit of FIG. 1.

DESCRIPTION OF THE PREFERRED EMBODIMENT

For ease of understanding and simplicity of description, only the horizontal channel of a CRT deflection system will be described. Any conventional or other compatible vertical control system may be used in combination with the horizontal channel in the manner described in the aforementioned Fiorletta et al patent.

Referring to FIG. 1, the principal components of the horizontal control system include a dual mode amplifier 10, a raster retrace command switch 11, the horizontal deflection yoke $L_D$ of the CRT (not shown), a flyback capacitor $C_{FB}$ and a yoke current sampling resistor $R_S$. The signals applied to the horizontal input terminal 12 of the dual mode amplifier are time multiplexed so that symbol writing signals may be applied during the vertical retrace time of the raster scan.

Consider the case of a conventional system where each frame comprises two fields of 262.5 mutually interlaced horizontal scan lines. At the beginning of each horizontal line a deflection signal is applied to the horizontal input terminal of the dual mode amplifier which operates in a linear mode to provide a proportional linear drive to the deflection coil $L_D$. At the end of each horizontal line, a mode switch signal is applied to input terminal 13 of the raster retrace command switch to produce non-linear resonant flyback operation of the deflection system. Briefly, this is accomplished by driving transistors Q10 and Q11 to a non-conductive state during the time they are normally conducting in response to a negative polarity input deflection signal. This causes the deflection coil and flyback capacitor to be connected to a high output impedance of the dual mode amplifier as provided by the non-conductive state of transistors Q10 and Q11 and the inverse impedance of diode D4. As a result, a half cycle resonant discharge oscillation occurs in the parallel connected flyback capacitor and induction coil circuit causing the CRT beam to retrace rapidly in readiness for the next horizontal scan line. The mode switching signal is removed from the input of the raster retrace command switch shortly before the start of each scan line so that the dual mode amplifier is ready to resume linear operation in response to the horizontal raster scan input signal. The electron beam, of course, is blanked from the CRT screen during flyback.

At the end of the last horizontal line of each field the beam is also vertically retraced in preparation for commencement of the next scanning field. The electron beam may also be blanked from the CRT screen during vertical retrace as is customary in standard t.v. operation; or, alternatively, this interval may be used for writing symbols at any desired location on the CRT screen for simultaneous display with the raster presentation. In the latter case, the above-described repetitive operation of the horizontal deflection system is discontinued during the vertical retrace interval and the dual mode amplifier is held continuously in a linear operational mode. Symbol writing is then accomplished simply by applying the horizontal positioning and symbol stroking signals to the input of the dual mode amplifier with the beam being unblanked only during symbol stroking. Simultaneously, appropriate positioning and writing symbols are applied to the linear vertical deflection amplifier. At the conclusion of the vertical retrace, raster scanning commences once again in the aforedescribed manner.

The components of the circuit of FIG. 1 are interconnected as follows. Input terminal 12 of the dual mode amplifier is coupled via the parallel connection of resistor R1 and capacitor C1 in series with resistor R2 to the base of transistor Q1. Resistor R3, which is connected from the base of transistor Q1 to ground, functions as a voltage divider in conjunction with resistors R1 and R2 to limit the input amplitude applied to the transistor and further provides a path to ground for the transistor base bias current to prevent the amplifier from saturating in the event input terminal 12 becomes open-circuited. The value of capacitor C1 is chosen to provide high frequency peaking of the signal applied to the base of transistor Q1 to increase the frequency response of the dual mode amplifier during linear operation. The feedback voltage $E_{FB}$ developed by the deflection coil current flowing through current sampling resistor $R_S$ is applied to the base of transistor Q2 by way of resistor R7. Transistors Q1 and Q2 are biased by resistors R4, R5, and R6 and form a differential amplifier which is used for comparison of the input and feedback signals. As indicated in the drawing, the base of transistor Q1 is a non-inverting input while the base of transistor Q2 is an inverting input. The amplified difference between the input and feedback voltages appears at the collector of transistor Q1 and is applied to the base of transistor Q3 which provides additional voltage gain. The value of resistor R8 connected to the emmitter of transistor Q3 is selected to provide the desired open-loop gain of the amplifier during linear operation. The collector of transistor Q3 connects directly to the base of transistor Q5, through capacitor C2 to the collector of transistor Q2 and through serially connected diodes D1, D2 and D3, connected in parallel with resistor R9, to the collector of transistor Q4 and the base of transistor Q6. Transistor Q4 is biased by resistors R10, R11, and R12 and functions as a constant current collector load for transistor Q3 thereby improving the driving capability of transistor Q3 into transistors Q5 and Q6.

Transistors Q5, Q8 and Q9 are arranged in a modified Darlington emitter follower configuration and likewise for transistors Q6, Q7, Q10 and Q11, the former group forming one section (the upper section) and the latter group the other section (the lower section) of a push-pull stage. The upper section responds to the positive portion of the input signal to provide the positive half of the deflection coil current by way of diode D4 as will be explained subsequently. The negative half of the deflection coil current is supplied from the lower section of the push-pull stage in response to the negative portion of the input signal. Transistors Q5 and Q6, connected respectively to resistors R14 and R15, supply emitter follower action to the anode of diode D4. These transistors also provide emitter follower voltage control over the output of the linear amplifier and therefore control the voltage at the driving end of the horizontal deflection coil. Since the feedback voltage is derived from sampling resistor $R_S$ the effective voltage drop across diode D4 is nullified.

During each resonant retrace period of the raster scan, a flyback voltage is developed at the junction of deflection coil $L_D$, diode D4, flyback capacitor $C_{FB}$ and the collectors of transistors Q10 and Q11. This voltage is quite high and for that reason the voltage ratings of transistors Q10 and Q11 and diode D4 must also be sufficiently high to withstand the flyback voltage. Diode D4 functions as a blocking diode during resonant retrace to prevent damage to the low voltage transistors in the upper section of the push-pull stage. Since presently available transistors for use as Q10 and Q11 capable of withstanding the flyback voltage have relatively low current gain characteristics, an emitter follower Q7 is required to provide additional current gain in the lower section.

Other circuit considerations relating to linear operation of the dual mode amplifier are as follows. Capacitor C2 connected between one output terminal of the differential amplifier and the collector of transistor Q3 functions as a feed-forward device to increase the frequency response of the amplifier. Series connected diodes D1, D2 and D3 joined in parallel with potentiometer R9 provides a bias current path for the complimentary input transistors Q5 and Q6 of the push-pull stage. Potentiometer R9 is normally adjusted to give the appropriate bias current to eliminate cross-over distortion in the amplifier. Resistors R14 and R15 serve to stabilize this bias current over the desired operating temperature range. Capacitor C3 connected in parallel with resistor R10 between ground and the base of transistor Q4 functions as a filter to eliminate alternating current noise and ripple from the base of the transistor. Resistor R13 is chosen to lower the driving impedance of transistor Q5 into the base terminals of transistors Q8 and Q9. Resistor R16 is likewise chosen to lower the driving impedance into the base of emitter follower connected transistor Q7 while R17 controls the power dissipation therein. Capacitor C4 eliminates spurious oscillation in emitter follower Q7 and resistor R18 stabilizes its operating point against temperature variations. Resistors R19 and R20 temperature stabilize the bias of transistors Q8 and Q9 respectively while resistors R21 and R22 provide temperature stabilization for transistors Q10 and Q11. Resistor R23 provides a direct current path to transistor Q6 whenever the dual mode amplifier is required to operate in a saturated or nearly saturated condition in response to a negative input signal, at which time the lower section of the push-pull stage is operative. The parallel connection of transistor Q8 and Q9 and likewise that of transistor Q10 and Q11 is provided merely to lower the power handling requirements of the respective parallel connected pairs. In the case of lower power requirements or higher rated components, transistors Q9 and Q11 and the associated resistors R20 and R22 could be eliminated.

A more detailed description of the operation of the apparatus of FIG. 1 will now be presented with additional reference to the waveforms of FIG. 2. Assume initially, that the horizontal raster scan input signal of FIG. 2*a*, applied to input terminal 12 of the dual mode amplifier, and the related yoke current of FIG. 2*b* are at their peak positive amplitude at time $t_1$. During the time interval from $t_1$ to $t_2$, the mode switching or horizontal sync signal applied to input terminal 13 of the raster retrace command switch 11 is at ground potential and the dual mode amplifier operates in a linear fashion. Thus, in the interval $t_1$ to $t_2$ the dual mode amplifier linearly converts the horizontal input raster scan signal to an equivalent yoke current. The symmetrical non-linearity, commonly referred to as S-shaping, evident on these waveforms compensates for tube geometry to assure constant beam velocity. Such correction is necessary when the CRT screen radius of curvature is greater than the radius of beam deflection as occurs when the CRT face is flat or nearly so. Since the slope of the yoke current is negative in this interval, the related yoke voltage is also negative from $t_1$ to $t_2$ as indicated in FIG. 2*e*. At, at time $t_2$ both the input signal and the yoke current reach a peak negative amplitude. Also, at time $t_2$, the mode switching signal rises from ground potential to a predetermined positive value which is amplified by the raster retrace command switch to a magnitude sufficient to force the lower section of the push-pull stage into an off state which effectively open circuits the output of the dual mode amplifier under the condition of a negative polarity raster scan input signal. The mode switching signal is the equivalent of a conventional horizontal sync signal which is introduced at a fixed time during each horizontal scan to terminate one line in preparation for the next. When the horizontal sync signal returns to ground potential, the raster retrace command switch is deactivated and the dual mode amplifier returns to linear operation in readiness for the next positive polarity segment of the horizontal raster scan input signal.

Figure 2A:
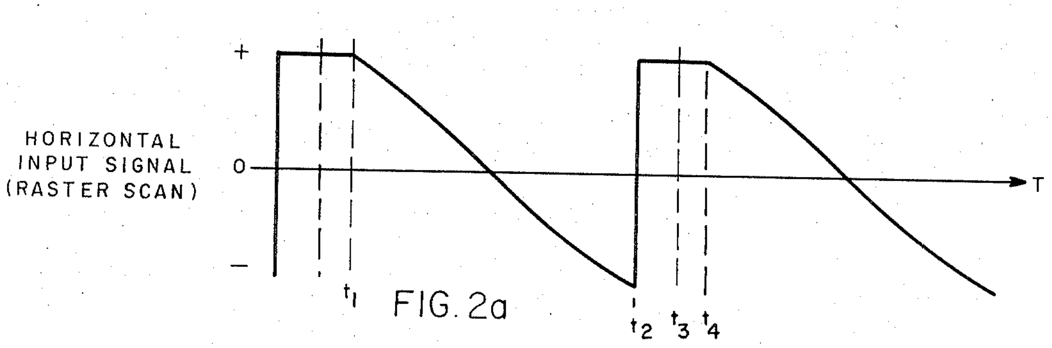
Figure 2B:
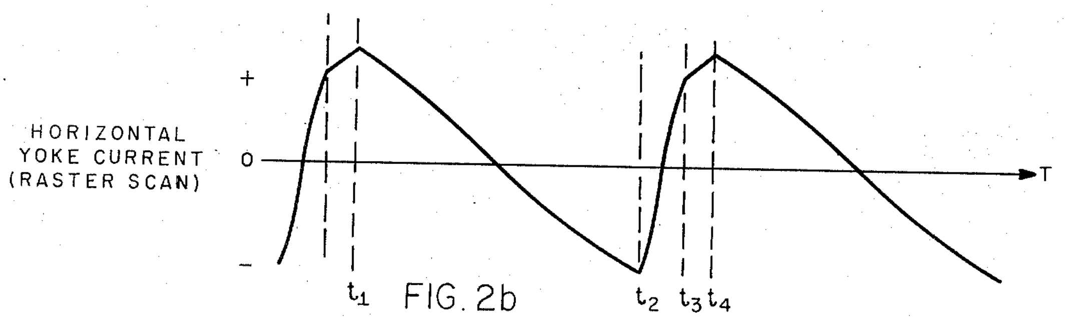
Figure 2C:
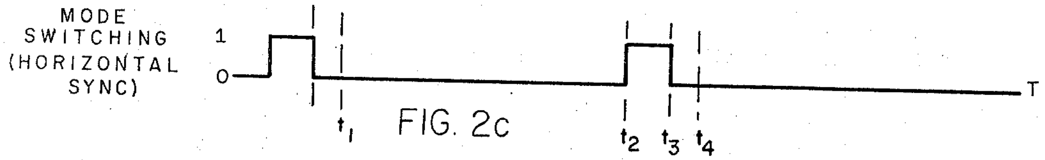
Figure 2D:
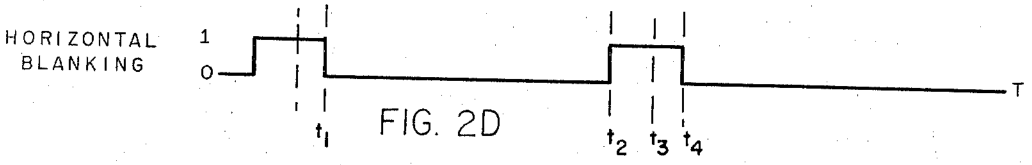
Figure 2E:
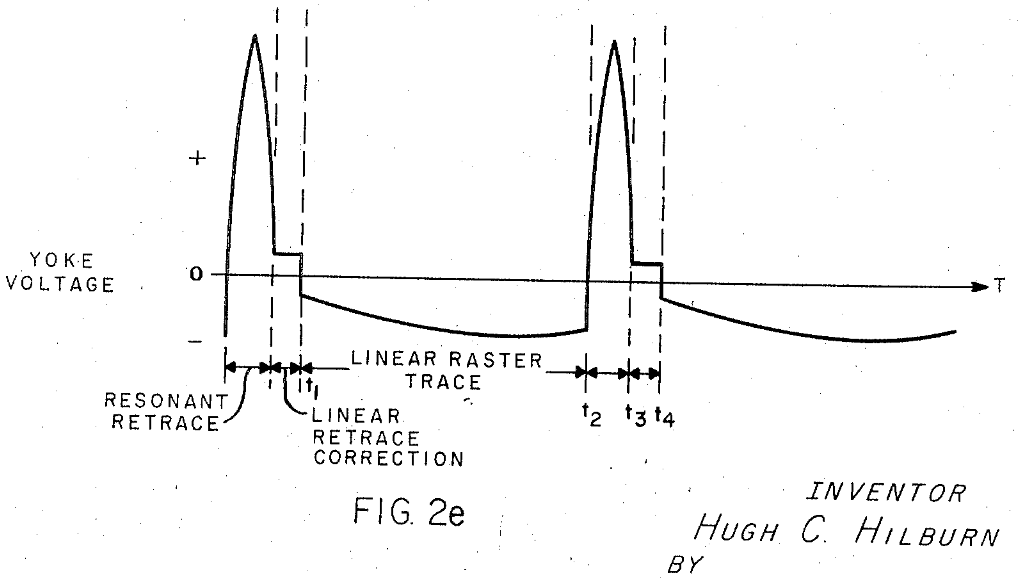

Upon the occurrence of the above mentioned open circuit or high impedance condition at the output of the dual mode amplifier at time $t_2$, a resonant oscillation condition is established in the parallel connected horizontal deflection coil $L_D$ and the flyback capacitor $C_{FB}$ which continues for one half period of sinusoidal oscillation at a frequency corresponding to the time interval from $t_2$ to $t_3$. During this interval the yoke current reverses from its peak negative amplitude to a positive value. As shown in FIG. 2*b*, however, the positive value of the yoke current at time $t_3$ is slightly less than its original value at time $t_1$. This loss in current level is due to circuit and yoke losses occurring during resonant retrace as a consequence of the Q of the system being less than infinity. As indicated in FIG. 2*e*, the induced yoke voltage completes a half cycle period in the interval $t_2$ to $t_3$ with a peak voltage of 10 or more times that of the linear trace or forward scanning voltage. Accordingly, the retrace action is extremely fast and this further is enhanced by the provision of a sharp rise time on the mode switching signal introduced at time $t_2$.

At time $t_3$, the mode switching signal returns to ground potential and the dual mode amplifier returns to the linear operating mode as previously mentioned. During the time interval $t_3$ to $t_4$ a linear retrace correction occurs, as a consequence of the output impedance of the dual mode amplifier being sufficiently low to rapidly damp the resonant oscillation at a small positive residual yoke voltage level which causes the yoke current to increase to a value at time $t_4$ equal to its value at time $t_1$. It will be noted that horizontal blanking is applied to the dual mode amplifier during the interval from $t_2$ to $t_4$, that is, for both horizontal retrace and linear retrace correction.

The value of the flyback capacitor $C_{FB}$ is chosen so that one-half of a resonant period of the parallel combination of the flyback capacitor and the deflection coil $L_D$ is approximately equal to the time duration of the mode switching signal. The linear retrace correction period then is simply equal to the time difference between the mode switching signal duration and the horizontal blanking signal.

Now consider the details of the construction and operation of the raster retrace command switch. The mode switching signal is applied at input terminal 13 through diodes D5, D6, and D7 to the base of transistor Q12. The three diodes in conjunction with the base to emitter voltage drop of the system provide a noise immunity sufficient to lessen the probability of un-desired horizontal flyback due to alternating current line noise. Resistor R25 functions to lower the base driving impedance of transistor Q12 so that turn off is more easily accomplished. The values of resistors R26, R27 and R28, interconnected between the collector of transistor Q12 and the base of transistor Q13 are determined in accordance with the following requirements. In the off state of transistor Q12, which corresponds to the linear operating mode of the dual mode amplifier, the ratios of resistors R26, R27 and R28 must be such that the base to emitter of transistor Q13 is reverse biased to hold this transistor in its off state. On the other hand, when transistor Q12 is driven into a saturated condition in response to an applied mode switching signal at input terminal 13 for the purpose of initiating a resonant retrace, transistor Q13 must also be forced into a saturated state. The ratio of resistor R27 to resistor R28 is therefore selected to provide forward bias of the base to emitter junction of transistor Q13 in a saturated state of transistor Q12. Capacitor C6 connected in parallel with resistor R27 enhances rapid saturation of transistor Q13. When transistor Q13 is in a saturated state, base to emitter conduction of transistors Q14 and Q15 is initiated via the connection of their emitters to the negative power supply $V^-$ culminating in a saturated condition of transistors Q14 and Q15 whereupon the base terminals of the transistors Q7, Q10 and Q11 are connected directly to the negative power supply and rapidly driven to a non-conducting state.

Further explanation of the raster retrace command switch will now be given with reference to the time scale indicated in FIGS. 2*a* to 2*e*. It has previously been explained that the dual mode amplifier operates in a linear mode during writing (vertical retrace), during linear raster tracing ($t_1$ to $t_2$) and during the linear retrace correction ($t_3$ to $t_4$). Consider the operation from a point in time immediately preceeding time $t_2$. At this instant the mode switching signal is at ground potential while the input signal, horizontal yoke current and yoke voltage are at or near their peak negative amplitudes. At time $t_2$, the mode switching signal and the raster scan input and deflection coil signals simultaneously start to rise to their respective peak positive amplitudes. The mode switching signal is amplified in transistors Q12 and Q13 of the raster retrace command switch and applied by way of resistors R29 and R30 to the bases of transistors Q14 and Q15 which saturate and thereby provide a closed circuit connection from the bases of transistors Q7, Q10 and Q11 to the negative power supply. This action removes the base drive signals from these transistors and rapidly drives them to an off state. The sudden high impedance presented to the horizontal deflection coil by the off state of transistors Q10 and Q11 together with the inverse inpedance of diode D4 forces a resonant condition on the parallel connection of the deflection coil and flyback capacitor. The resulting yoke current and yoke voltage waveforms change as previously explained with reference to FIGS. 2*b* and 2*e* in the time interval from $t_2$ to $t_3$.

During the time interval in which resonant retrace is occurring, transistors Q5, Q8 and Q9 are biased in a manner which attempts to drive them to a conductive state but conduction therefrom to the deflection coil is prohibited by diode D4 which is backbiased by the large flyback voltage. During the interval $t_3$ to $t_4$, however, the yoke flyback voltage has already completed the half cycle of resonant oscillation required for flyback and diode D4 becomes forward biased enabling the dual mode amplifier to return to a linear feedback operating condition. Thus, at time $t_3$ when the mode switching signal returns to ground potential, the raster retrace command switch is inactivated and becomes ineffectual with regard to further circuit action until the commencement of the next retrace period initiated upon presentation of another mode switching input signal.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An electron beam deflection control system including a deflection coil, a capacitor coupled to the deflection coil, and a dual mode amplifier controllably operable in either a linear mode for scanning or stroking the beam or in a resonant non-linear beam retrace mode, wherein the dual mode amplifier comprises an input stage for receiving an input signal indicative of the desired deflection of the beam, an output stage having first and second push-pull operated sections forming respective halves of the output stage and coupled to receive the output signal of the input stage for controlling current flow through the coil in one direction or the other in accordance with the relative conductivity of the respective sections, each section having an output lead through which the controlled current is supplied to a common output terminal coupled to the coil, unidirectional current conductive means included in the lead between the common output terminal and the first section and poled so that for one polarity of the input signal current is supplied to the coil from said first section via the unidirectional current conductive means for deflecting the beam, and switching means coupled to the second section for abruptly terminating conductive operation thereof occurring in response to the opposite polarity of the input signal whereby as a consequence of the instantaneously non-conductive state of both the first and second sections an interval of resonant oscillation commences between the coil and capacitor for effecting a resonant retrace of the beam, and during which interval the unidirectional current conductive means operates to preclude current flow from the coil and capacitor into said first section.

2. The system of claim 1 wherein the first and second sections of the push-pull stage each include a plurality of cascaded transistors connected such that the last transistor of the first section has its emitter coupled to a potential source of predetermined polarity and its collector connected to the lead including the unidirectional current conductive means which is poled to conduct current supplied from said potential source of predetermined polarity, and the last transistor of the second section has its emitter coupled to a potential source of polarity opposite to said predetermined polarity and its collector connected to the lead coupled to said common output terminal.

3. The system of claim 2 wherein the switching means for abruptly terminating conductive operation of the second section includes a switching transistor which has its emitter connected to the potential source of opposite polarity and its collector connected to the base of the last transistor of the second section whereby upon the switching transistor being driven into saturation by a switching signal applied thereto the potential source of opposite polarity is applied through said switching transistor to drive the last transistor of the second section into a non-conductive state.

4. The system of claim 2 wherein the last transistor of the first section is complementary to the last transistor of the second section and in each of the first and second sections the penultimate transistor of the cascaded transistors is connected in parallel with the last transistor and the transistor immediately preceding the penultimate transistor couples to the base of both the penultimate and last transistors.

5. The system of claim 4 wherein in the second section the transistor immediately preceding the penultimate transistor is connected as an emitter follower which has its base coupled to receive the output signal of the input stage and its emitter coupled to the base of the penultimate and last transistors.

6. The system of claim 5 including means for applying to the input stage a signal representative of the beam deflection to be compared with the input signal indicative of the desired beam deflection.

7. The system of claim 6 wherein the switching means for abruptly terminating conductive operation of the second section includes a pair of switching transistors each of which has its emitter connected to the potential source of opposite polarity, the collector of one of the pair of switching transistors connected to the bases of the penultimate and last transistors of the second section and the collector of the other of the pair of switching transistors connected to the base of the emitter follower connected transistor of the second section whereby upon said pair of switching transistors being driven into saturation by a switching signal applied thereto the potential source of opposite polarity is applied through said pair of switching transistors to drive the emitter follower, penultimate, and last transistors of the second section into a non-conductive state.

* * * * *